(12) United States Patent
Baba et al.

(10) Patent No.: US 7,069,884 B2
(45) Date of Patent: Jul. 4, 2006

(54) INTERNAL COMBUSTION ENGINE

(75) Inventors: Atsushi Baba, Wako (JP); Tsuneo Endoh, Wako (JP); Masashi Shinohara, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/495,453

(22) PCT Filed: Oct. 23, 2002

(86) PCT No.: PCT/JP02/11011

§ 371 (c)(1),
(2), (4) Date: Nov. 29, 2004

(87) PCT Pub. No.: WO03/042524

PCT Pub. Date: May 22, 2003

(65) Prior Publication Data

US 2005/0076863 A1 Apr. 14, 2005

(30) Foreign Application Priority Data

Nov. 15, 2001 (JP) .............................. 2001-350366

(51) Int. Cl.
*F02F 1/36* (2006.01)
(52) U.S. Cl. .......................... 123/41.82 R; 123/41.77; 123/41.79
(58) Field of Classification Search ......... 123/41.82 R, 123/41.85, 41.76, 41.77, 41.79
See application file for complete search history.

(56) References Cited

U.S. PATENT DOCUMENTS 6,832,475 B1 * 12/2004 Tanaka et al. ................ 60/298

FOREIGN PATENT DOCUMENTS

| JP | 61-36414 U | 3/1986 |
| JP | 61-036414 U | 3/1986 |
| JP | 5-133225 A | 5/1993 |
| JP | 05-133225 A | 5/1993 |
| JP | 7-259548 A | 10/1995 |
| JP | 2001-132444 A | 5/2001 |

* cited by examiner

*Primary Examiner*—Noah P. Kamen
(74) *Attorney, Agent, or Firm*—Birch, Stewart, Kolasch & Birch, LLP (57) ABSTRACT

An internal combustion engine is provided in which an exhaust port communicating with a combustion chamber formed in a cylinder head is formed from independent exhaust ports, which are positioned on the upstream side, and a grouped exhaust port, in which the plurality of independent exhaust ports are combined. Water supplied from a supply pump passes through a water passage of the grouped exhaust port and a water passage of the independent exhaust ports while cooling the exhaust port, and a valve seat and valve guide on the periphery of the exhaust port, which have high temperatures, thus heating the water itself and thereby recovering waste heat of the internal combustion engine. The heated water carries out heat exchange with exhaust gas in an evaporator provided in an exhaust passage and turns into high temperature, high pressure steam, which drives an expander of a Rankine cycle system. It is thereby possible to maximize the recovery of heat transferred from the exhaust port to the cylinder head of the internal combustion engine.

22 Claims, 10 Drawing Sheets

INTERNAL COMBUSTION ENGINE

FIELD OF THE INVENTION

The present invention relates to an internal combustion engine that includes an exhaust port within a cylinder head, exhaust gas being discharged from a combustion chamber into the exhaust port.

BACKGROUND ART

There is known from Japanese Patent Application Laid-open No. 2001-132444 an arrangement in which an exhaust port communicating with a combustion chamber of an internal combustion engine is formed from a pipe-shaped member, and by supporting this exhaust port within a cylinder head via a heat insulating layer, it is made difficult for exhaust gas heat to be transferred from the exhaust port to the cylinder head, thus maintaining the exhaust gas at as high a temperature as possible and thereby promoting the warm-up of the internal combustion engine and the early activation of an exhaust gas purification catalyst.

However, in order to recover as much as possible of the waste heat of the internal combustion engine as high temperature steam, it is not enough only to make an evaporator provided in an exhaust passage exhibit its performance effectively by maintaining the temperature of the exhaust gas at a high temperature; it is also necessary to recover heat transferred from the exhaust port to the cylinder head and dissipated to the atmosphere. It is therefore necessary to absorb effectively the heat transferred from the exhaust port to the cylinder head with water flowing through a water passage formed around the exhaust port, thus increasing the temperature of the water as much as possible.

SUMMARY OF THE INVENTION

The present invention has been accomplished under the above-mentioned circumstances, and it is an object thereof to recover as much as possible of the heat transferred from an exhaust port to a cylinder head of an internal combustion engine.

In order to attain this object, in accordance with a first aspect of the present invention, there is proposed an internal combustion engine wherein the surroundings of an exhaust port that is formed within a cylinder head and that communicates with a combustion chamber are covered by a water passage.

In accordance with this arrangement, since the surroundings of the exhaust port are covered by the water passage, it is possible to cool effectively the exhaust port, which has its temperature increased by high temperature exhaust gas discharged from the combustion chamber, and it is possible to recover effectively the heat of the exhaust gas with water flowing through the water passage.

Furthermore, in accordance with a second aspect of the present invention, in addition to the first aspect, there is proposed an internal combustion engine wherein low temperature water is supplied to at least the water passage passing through a location of the exhaust port that has a high cooling requirement.

In accordance with this arrangement, since the location of the exhaust port that has a high cooling requirement is cooled with low temperature water, not only is it possible to enhance the effect of recovering waste heat of the exhaust gas by cooling effectively a high temperature section of the exhaust port, but it is also possible to suppress thermal expansion of the location of the exhaust port that has a high cooling requirement, thereby maintaining dimensional and positional precision and maintaining a desired function.

Moreover, in accordance with a third aspect of the present invention, in addition to the first or second aspect, there is proposed an internal combustion engine wherein low temperature water is supplied to at least the water passage passing through a location where the exhaust port is in contact with another member.

In accordance with this arrangement, since the location where the exhaust port is in contact with another member is cooled with low temperature water, not only is it possible to suppress the dissipation of heat via the other member so as to further enhance the effect of recovering waste heat of the exhaust gas, but it is also possible to suppress thermal expansion of the other member, thereby maintaining dimensional and positional precision and maintaining a desired function.

Furthermore, in accordance with a fourth aspect of the present invention, in addition to any one of the first to the third aspects, there is proposed an internal combustion engine wherein low temperature water is supplied to at least the water passage passing through a location that is in contact with an exhaust valve provided in the exhaust port.

In accordance with this arrangement, since the location that is in contact with the exhaust valve is cooled with low temperature water, not only is it possible to suppress the dissipation of heat via the exhaust valve so as to further enhance the effect of recovering waste heat of the exhaust gas, but it is also possible to suppress thermal expansion of the exhaust valve, thereby maintaining dimensional and positional precision.

Moreover, in accordance with a fifth aspect of the present invention, in addition to any one of the first to the fourth aspects, there is proposed an internal combustion engine wherein low temperature water is supplied to at least the water passage passing through the vicinity of a valve seat of the exhaust valve.

In accordance with this arrangement, since the vicinity of the valve seat is cooled with low temperature water, not only is it possible to suppress the dissipation of heat via the valve seat so as to further enhance the effect of recovering waste heat of the exhaust gas, but it is also possible to suppress thermal expansion of the valve seat, thereby maintaining dimensional and positional precision.

Furthermore, in accordance with a sixth aspect of the present invention, in addition to any one of the first to the fourth aspects, there is proposed an internal combustion engine wherein low temperature water is supplied to at least the water passage passing through the vicinity of a valve guide of the exhaust valve.

In accordance with this arrangement, since the vicinity of the valve guide is cooled with low temperature water, not only is it possible to suppress the dissipation of heat via the valve guide so as to further enhance the effect of recovering waste heat of the exhaust gas, but it is also possible to suppress thermal expansion of the valve guide, thereby maintaining dimensional and positional precision.

Moreover, in accordance with a seventh aspect of the present invention, in addition to any one of the first to the sixth aspects, there is proposed an internal combustion engine wherein water that has passed through the water passage and has an increased temperature is used as a heat source for other auxiliary equipment.

In accordance with this arrangement, since the water that has passed through the water passage and has an increased temperature is used as the heat source for other auxiliary equipment, the waste heat of the internal combustion engine can be utilized effectively without being wastefully disposed of.

An expander 12 of an embodiment corresponds to the auxiliary equipment of the present invention.

BRIEF DESCRIPTION OF THE DRAWINGS

FIG. 1 to FIG. 11B show one embodiment of the present invention;

BEST MODE FOR CARRYING OUT THE INVENTION

An embodiment of the present invention is explained below with reference to FIG. 1 to FIG. 11B.

Figure 1:
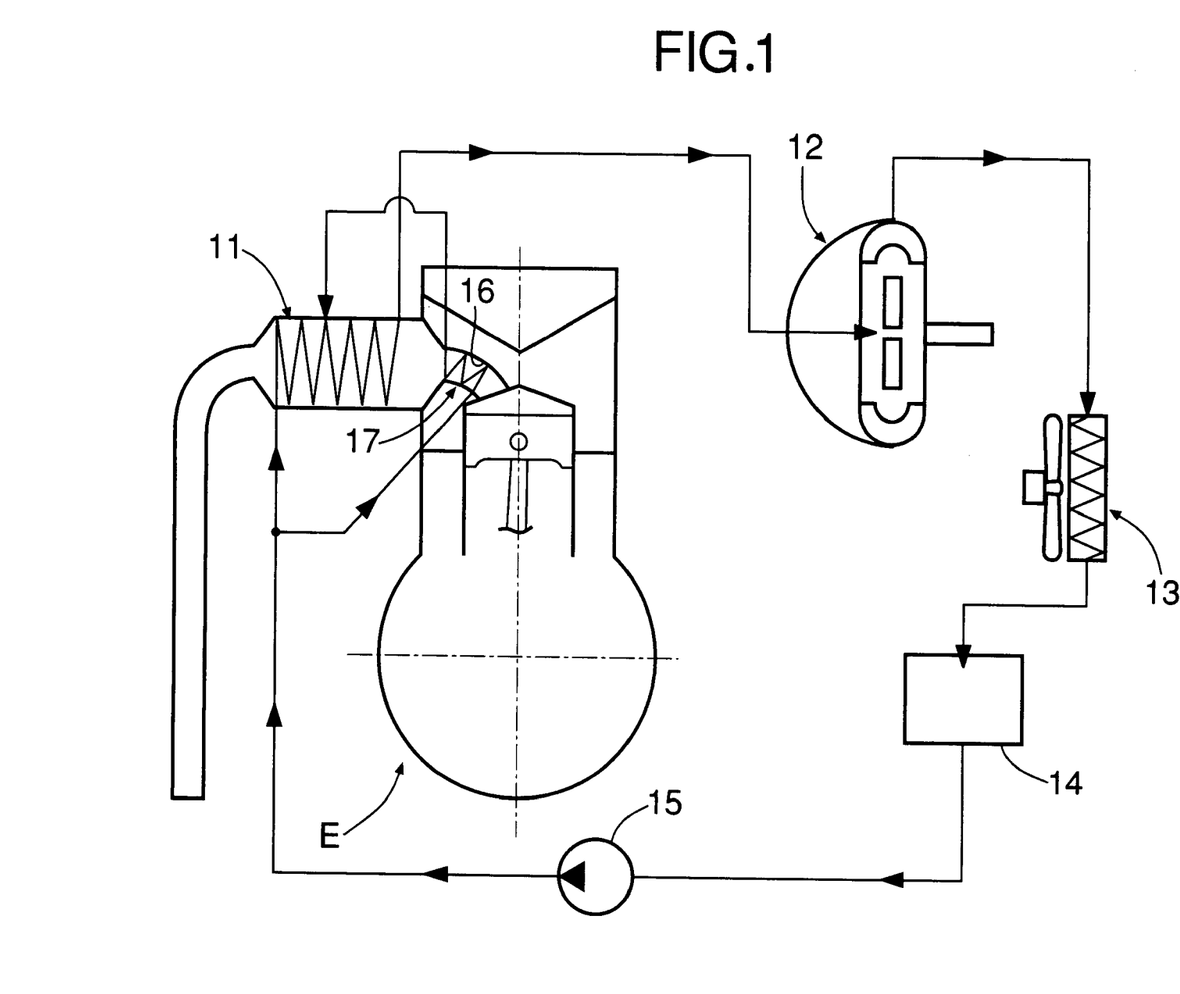
FIG. 1 is a diagram showing the overall arrangement of a Rankine cycle system.

FIG. 1 shows the overall arrangement of a Rankine cycle system to which the present invention is applied.

The Rankine cycle system, which recovers the thermal energy of an exhaust gas of an internal combustion engine E and converts it into mechanical energy, includes a main evaporator 11 that heats water with exhaust gas discharged from the internal combustion engine E so as to generate high temperature, high pressure steam, an expander 12 that is operated by the high temperature, high pressure steam generated by the main evaporator 11 so as to generate mechanical energy, a condenser 13 that cools decreased temperature, decreased pressure steam that has completed work in the expander 12 so as to turn it back into water, a reservoir tank 14 for collecting water discharged from the condenser 13, and a supply pump 15 for pressurizing the water collected in the reservoir tank 14. The major portion of the water discharged from the supply pump 15 is supplied to the main evaporator 11, which is provided downstream of an exhaust port 16 of the internal combustion engine E, turns into high temperature, high pressure steam in the main evaporator 11, and is supplied to the expander 12, and a portion of water discharged from the supply pump 15 is heated while passing through an auxiliary evaporator 17 provided on the outer periphery of the exhaust port 16, and then merges into the main evaporator 11 at a predetermined position.

The main evaporator 11 carries out heat exchange mainly with the exhaust gas discharged from the exhaust port 16 and generates steam, but the auxiliary evaporator 17 carries out heat exchange not only with the exhaust gas flowing through the exhaust port 16 but also with the exhaust port 16 itself, which is in contact with a high temperature exhaust gas, thus generating steam and simultaneously cooling the exhaust port 16.

Figure 2:
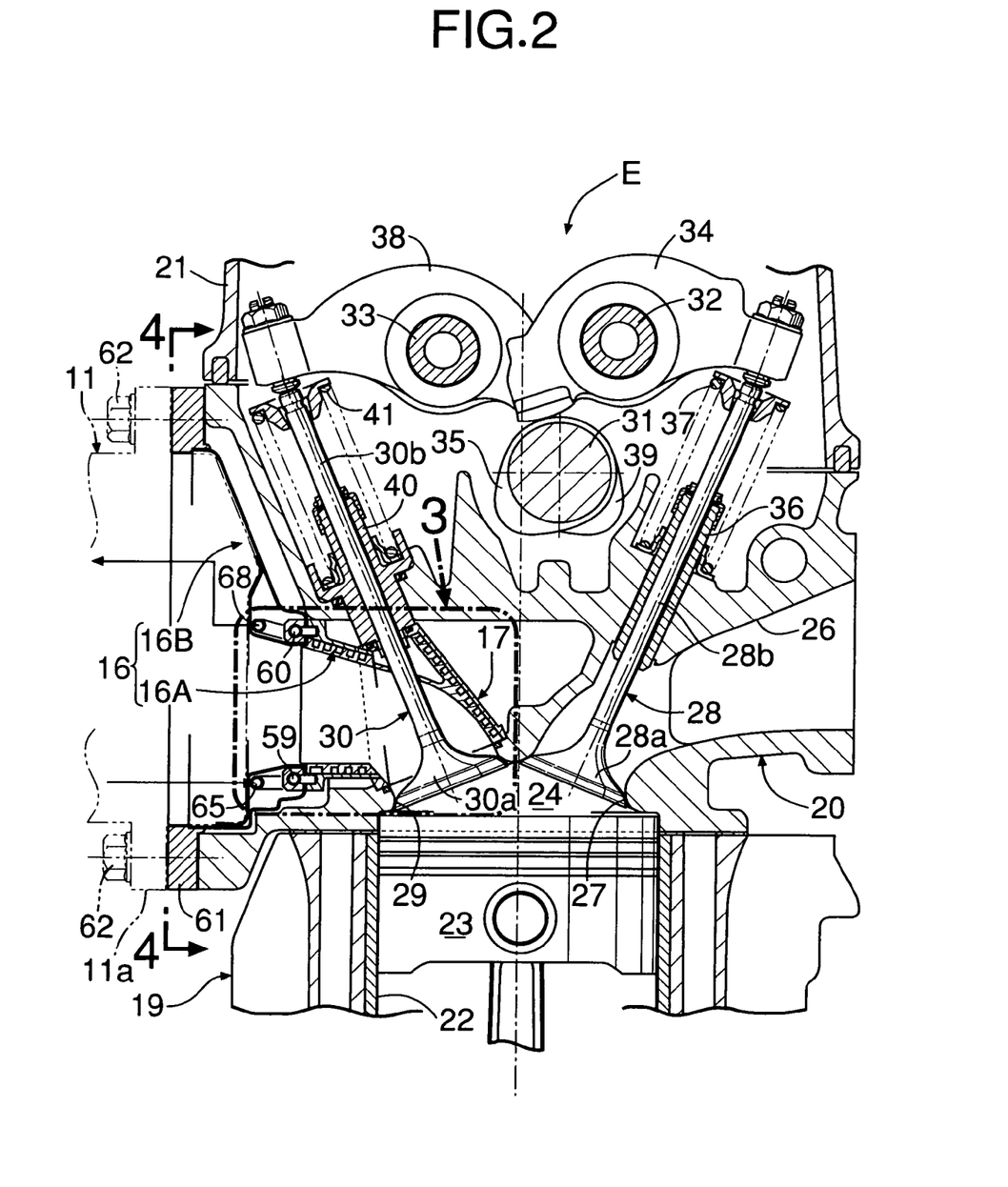
FIG. 2 is a vertical sectional view of the surroundings of a cylinder head of an internal combustion engine.

As shown in FIG. 2, a cylinder head 20 and a head cover 21 are joined to a cylinder block 19 of the in-line four-cylinder internal combustion engine E, and four combustion chambers 24 are formed between the lower face of the cylinder head 20 and the upper face of each of four pistons 23 slidably fitted in four cylinder sleeves 22 housed in the cylinder block 19. Formed in the cylinder head 20 are intake ports 26 and exhaust ports 16, which communicate with the corresponding combustion chambers 24. An intake valve seat 27 at the downstream end of the intake port 26 is opened and closed by a head 28a of an intake valve 28, and an exhaust valve seat 29 at the upstream end of the exhaust port 16 is opened and closed by a head 30a of an exhaust valve 30. Whereas the intake port 26 is formed directly in the cylinder head 20, the exhaust port 16 is formed from four independent exhaust ports 16A and one grouped exhaust port 16B, each thereof being made of a member that is separate from the cylinder head 20 and fitted in the cylinder head 20.

Supported on the cylinder head 20 are a single camshaft 31, a single intake rocker arm shaft 32, and a single exhaust rocker arm shaft 33. One end of an intake rocker arm 34 rockably supported by the intake rocker arm shaft 32 abuts against an intake cam 35 provided on the camshaft 31, and the other end thereof abuts against a stem 28b of the intake valve 28, which is slidably supported by an intake valve guide 36 provided in the cylinder head 20 and is urged upward by a valve spring 37. Furthermore, one end of an exhaust rocker arm 38 rockably supported by the exhaust rocker arm shaft 33 abuts against an exhaust cam 39 provided on the camshaft 31, and the other end thereof abuts against the upper end of a stem 30b of the exhaust valve 30, which is slidably supported by an exhaust valve guide 40 provided in the cylinder head 20 and is urged upward by a valve spring 41.

The exhaust port 16 is formed from the four independent exhaust ports 16A, which are positioned on the upstream side of the flow of exhaust gas, and the single grouped exhaust port 16B, which communicates with the downstream side of the independent exhaust ports 16A, and an end portion on the upstream side of the main evaporator 11 is fitted into the inside of the grouped exhaust port 16B. The auxiliary evaporator 17 is provided so as to straddle the independent exhaust ports 16A and the grouped exhaust port 16B communicating with the downstream side thereof.

Figure 3:
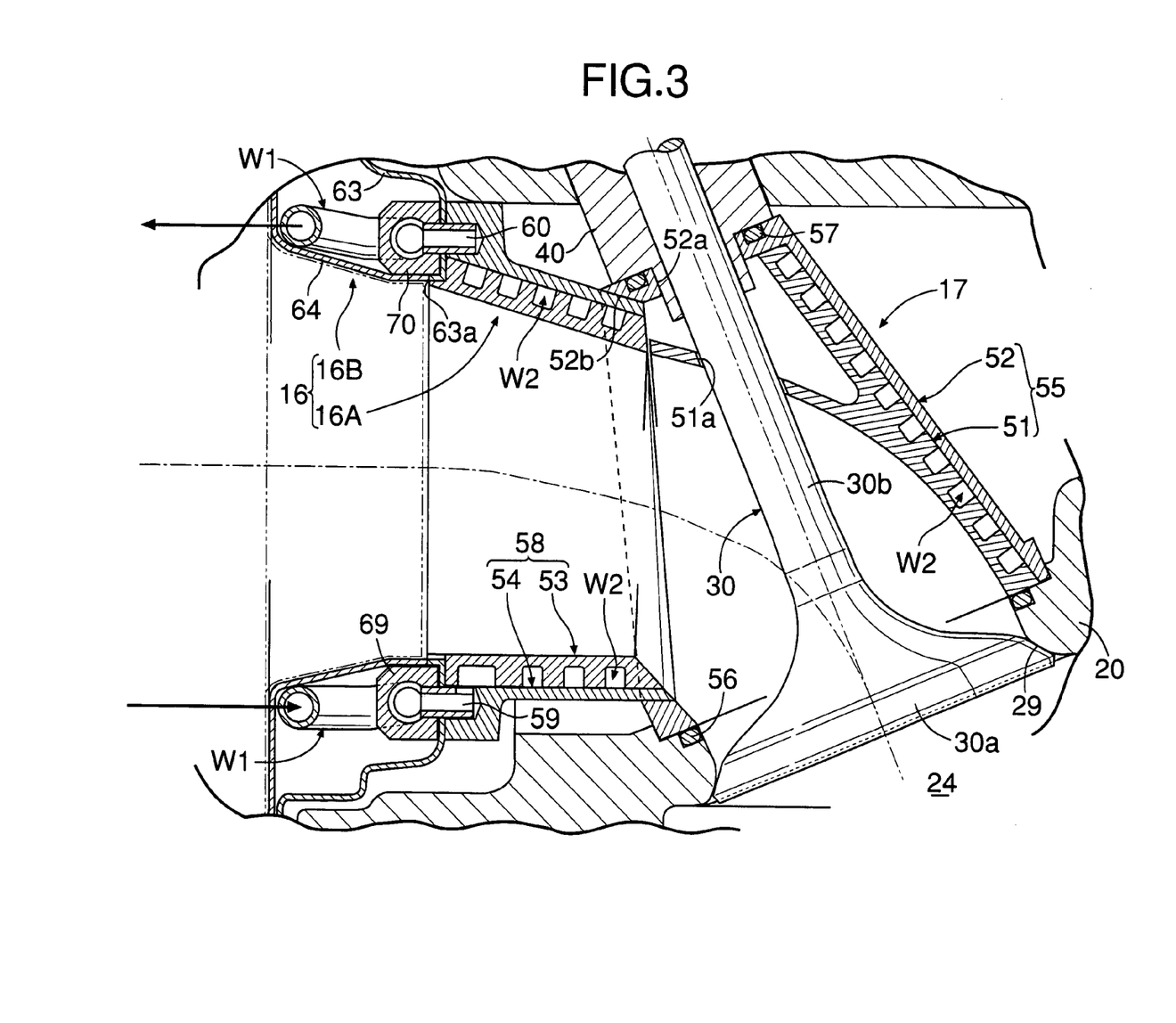
FIG. 3 is an enlarged view of a part 3 in FIG. 2.
Figure 7:
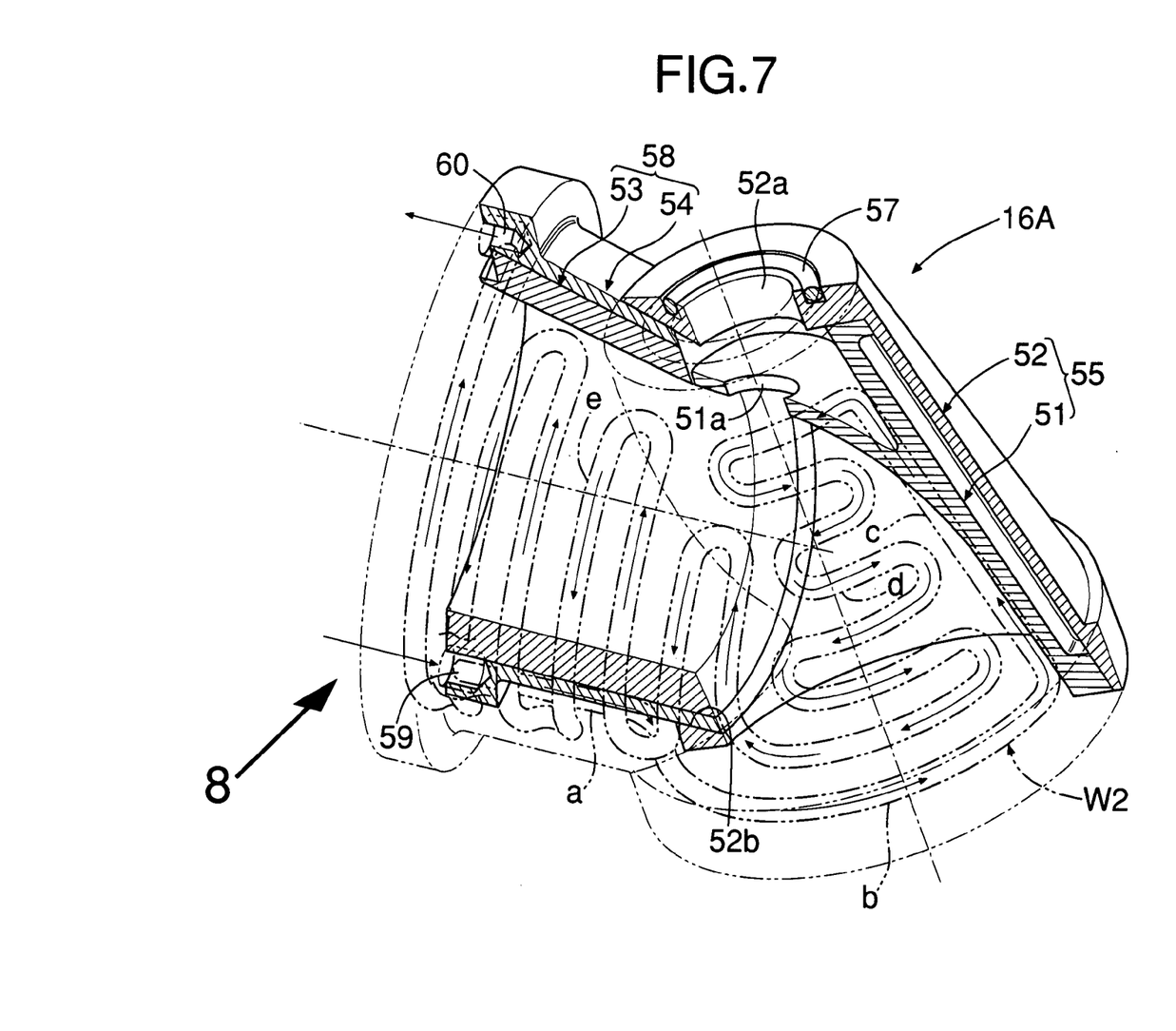
FIG. 7 is a partially cutaway perspective view of an independent exhaust port.

The structure of the independent exhaust ports 16A is first explained in detail with reference to FIG. 3 and FIG. 7.

The independent exhaust port 16A is formed from a first port member 51, a first cover member 52, a second port member 53, and a second cover member 54. The first port member 51 and the first cover member 52 form an upstream portion 55 of the independent exhaust port 16A that communicates with the combustion chamber 24, and have a structure in which the first port member 51, which is on the inside, is covered by the first cover member 52, which is on the outside, and a labyrinth-shaped water passage W2 is formed between the inner face of the first cover member 52 and a channel formed on the outer face of the first port member 51. The lower faces of the first port member 51 and the first cover member 52 abut against the upper face of the exhaust valve seat 29, which is formed in the cylinder head 20, via a seal 56. Moreover, an opening 51a through which the stem 30b of the exhaust valve 30 runs is formed in an upper wall of the first port member 51, and the lower end of the exhaust valve guide 40 is fitted via a seal 57 in an opening 52a formed on an upper wall of the first cover member 52.

The second port member 53 and the second cover member 54 form a downstream portion 58 of the independent exhaust port 16A, which communicates with the main evaporator 11, and have a structure in which the second port member 53, which is on the inside, is covered by the second cover member 54, which is on the outside, and the labyrinth-shaped water passage W2 is formed between the inner face of the second cover member 54 and a channel formed on the outer face of the second port member 53. An end portion of the second cover member 54 is fitted in an opening 52b formed in a side face of the first cover member 52, thereby joining the first port member 51 and the second port member 53 smoothly so as to define a curved passage for the exhaust gas. The water passage W2 defined by the second port member 53 and the second cover member 54 includes a water inlet 59 on the lower side thereof and a water outlet 60 on the upper side thereof.

Figure 8:
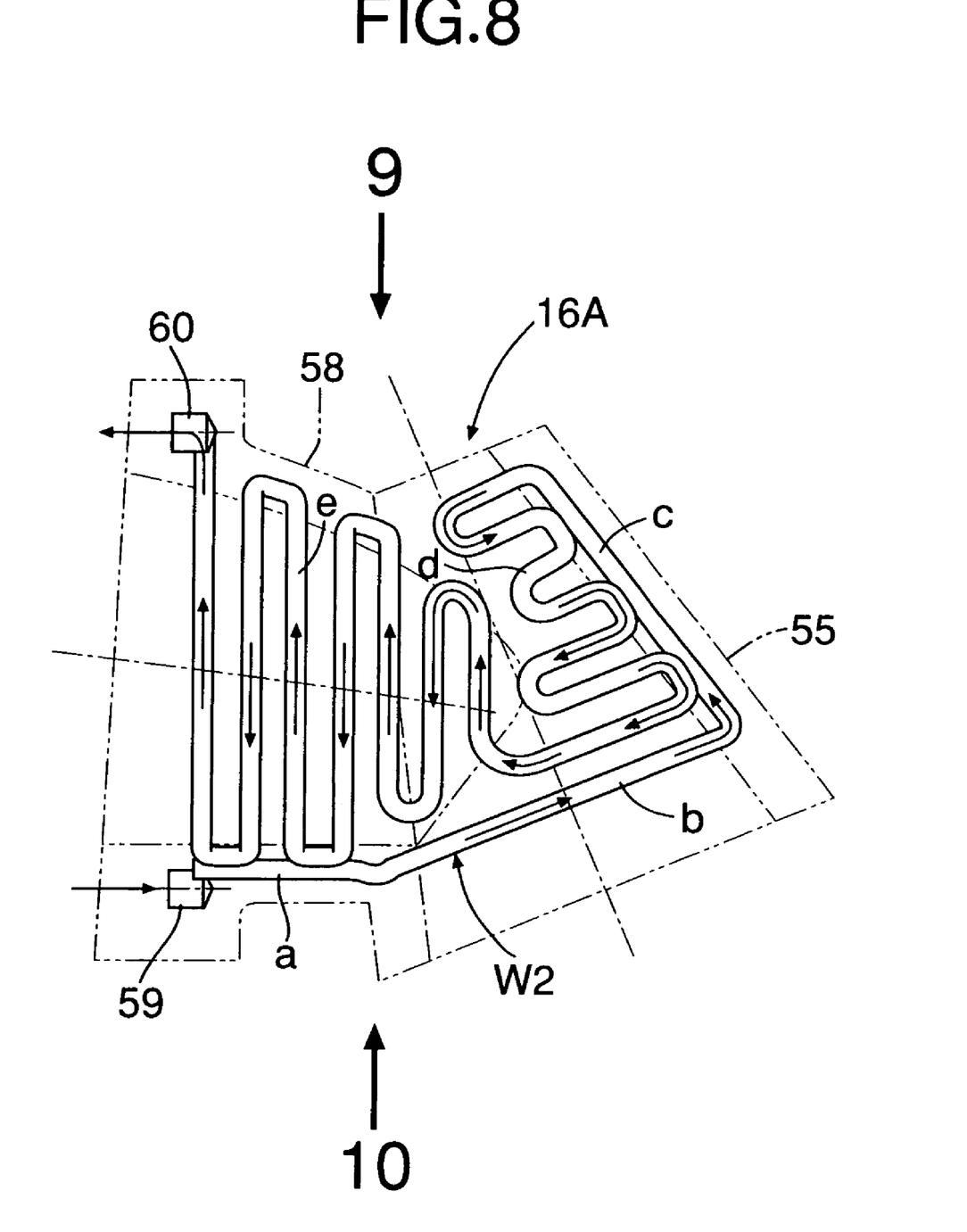
FIG. 8 is a view from arrow 8 in FIG. 7.
Figure 9:
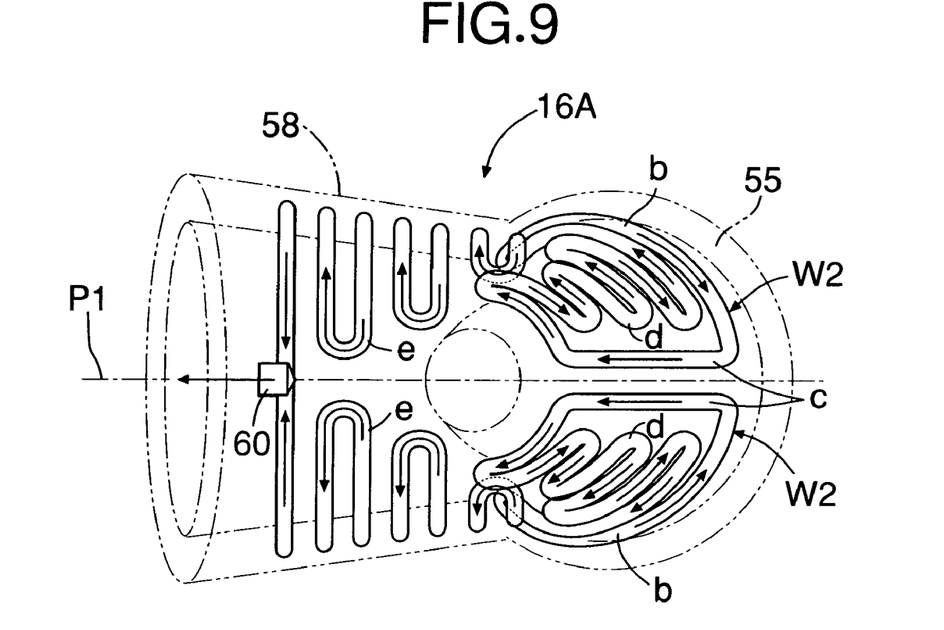
FIG. 9 is a view from arrow 9 in FIG. 8.
Figure 10:
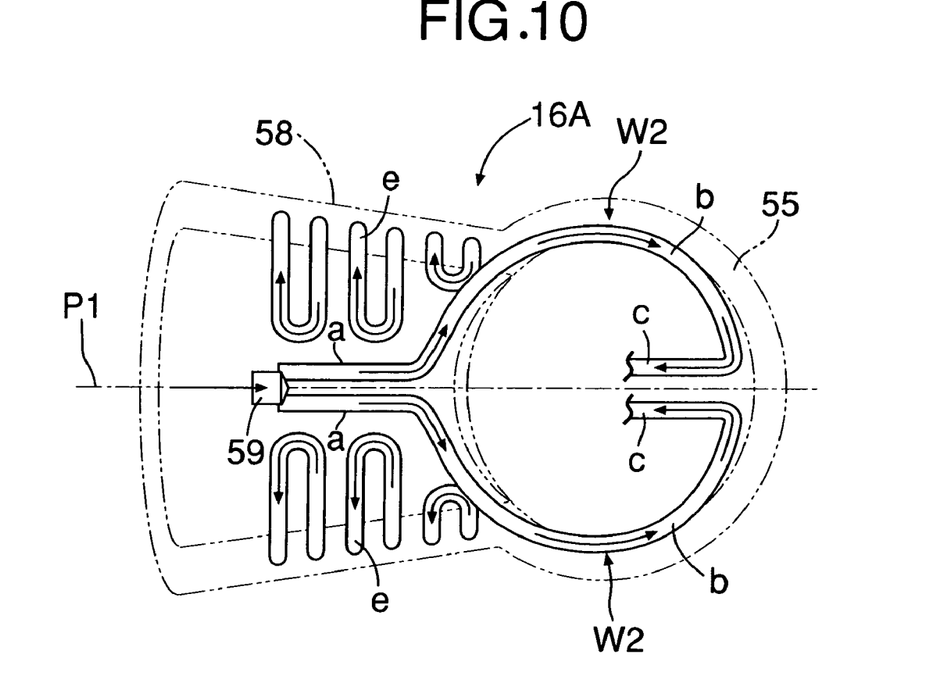
FIG. 10 is a view from arrow 10 in FIG. 8.

The shape of the water passage W2 of the independent exhaust port 16A is now explained with reference to FIG. 8 to FIG. 10.

The water passage W2 is formed with lateral symmetry relative to a plane of symmetry P1 of the independent exhaust port 16A; immediately after the water inlet 59 the water passage W2 branches into two lines so as to sandwich the plane of symmetry P1 and the two lines merge again immediately before the water outlet 60. To explain in more detail, the water passage W2 extends linearly from the water inlet 59 along a lower face of the downstream portion 58 (part a), moves therefrom to the upstream portion 55, extends in a semicircular shape around the head 30a of the exhaust valve 30 (part b), extends therefrom linearly upward along the stem 30b of the exhaust valve 30 up to the vicinity of the lower end of the exhaust valve guide 40 (part c), extends therefrom toward the head 30a of the exhaust valve 30 while bent in a zigzag shape (part d), returns therefrom back to the downstream portion 58, and extends toward the water outlet 60 while bent in a zigzag shape (part e).

The structure of the grouped exhaust port 16B is now explained in detail with reference to FIG. 2 to FIG. 6.

The grouped exhaust port 16B includes a rectangular frame-shaped flange 61, and by tightening a plurality of bolts 62 running through a flange 11a of the main evaporator 11 to the cylinder head 20 the main evaporator 11 and the grouped exhaust port 16B are together secured to the cylinder head 20 (see FIG. 2). The downstream end of a pressed sheet material third port member 63 is welded to the flange 61 of the grouped exhaust port 16B, and four openings 63a formed in the upstream end of the third port member 63 communicate with exits of the four independent exhaust ports 16A. The downstream end of a pressed sheet material fourth port member 64 is welded to an inner face of the third port member 63, and the upstream end of the fourth port member 64 is superimposed on the four openings 63a of the third port member 63 and welded. The exhaust gases discharged from the four independent exhaust ports 16A are therefore merged in the grouped exhaust port 16B, and guided evenly to the main evaporator 11.

Water passages W1, W1, which are formed from a pipe material, are disposed in a space surrounded by the third port member 63 and the fourth port member 64 of the grouped exhaust port 16B. Since the water passages W1, W1 have a symmetrical structure relative to a plane of symmetry P2, FIG. 4 to FIG. 6, FIG. 11A, and FIG. 11B show the water passage W1 on one side of the plane of symmetry P2. The water passage W1 has a first line passing through the independent exhaust port 16A(1) on the side close to the plane of symmetry P2 and a second line passing through the independent exhaust port 16A(2) on the side far from the plane of symmetry P2.

Figure 4:
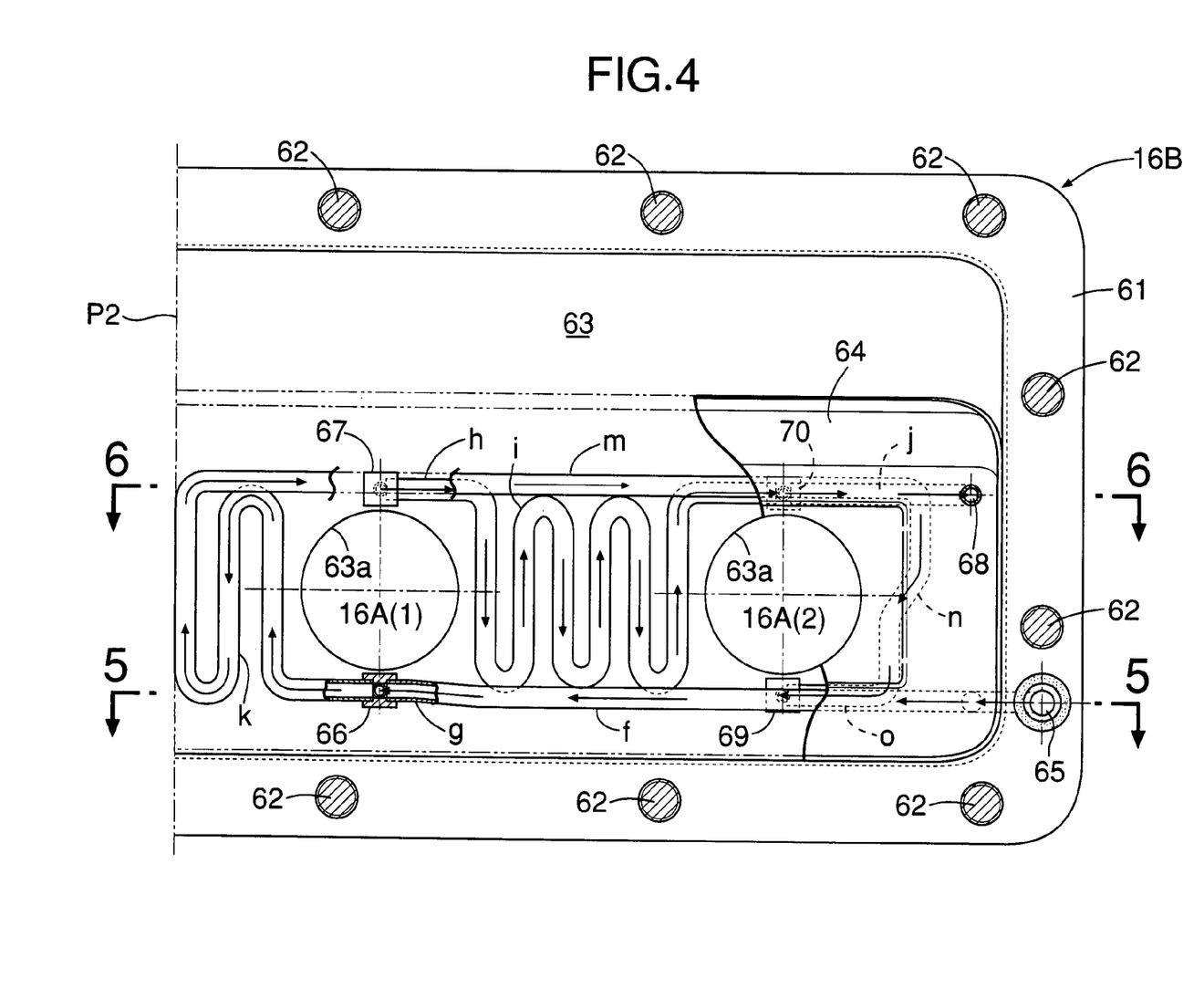
FIG. 4 is a view from arrowed line 4—4 in FIG. 2.
Figure 5:
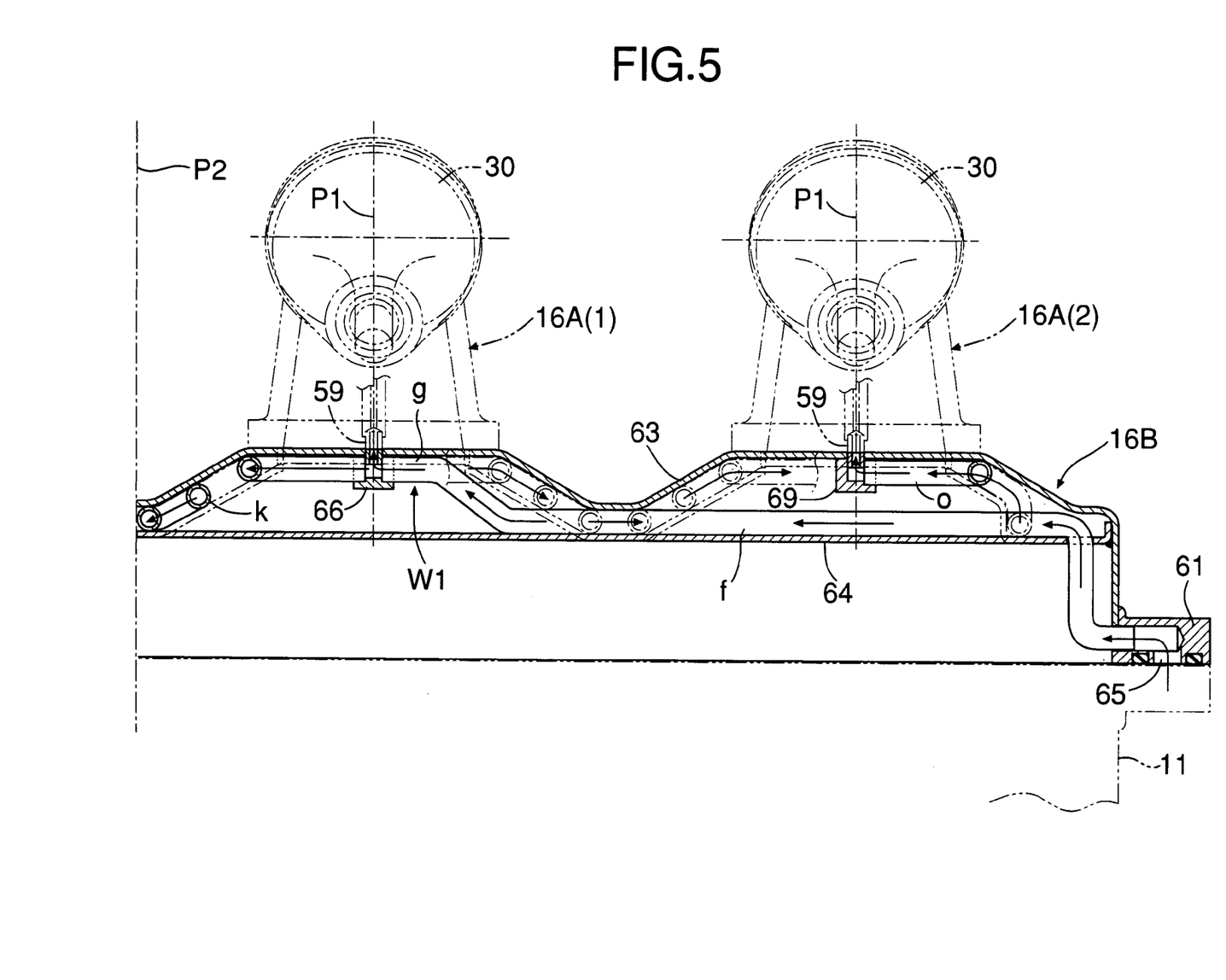
FIG. 5 is a sectional view along line 5—5 in FIG. 4.
Figure 6:
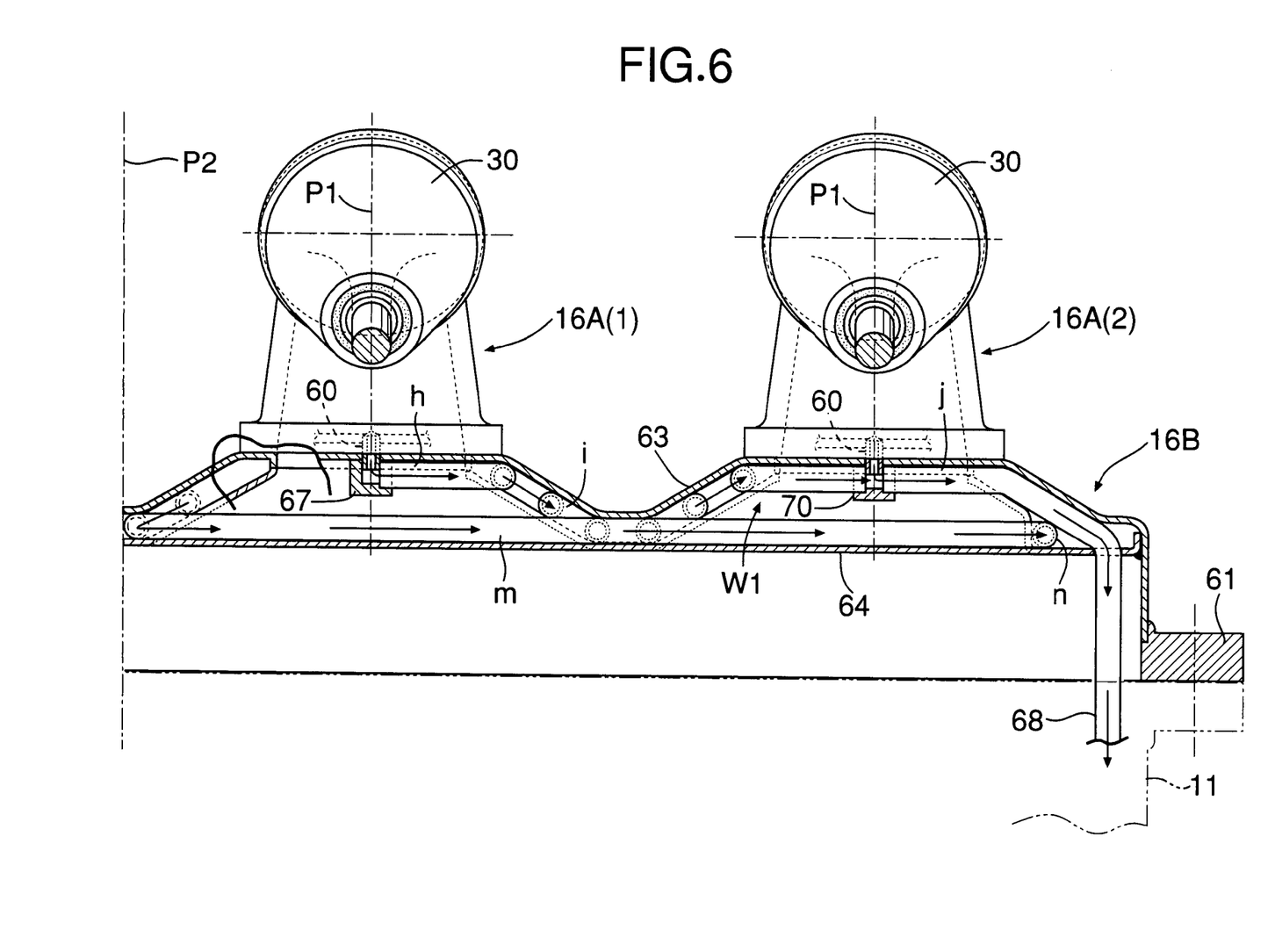
FIG. 6 is a sectional view along line 6—6 in FIG. 4.

That is, the water passage W1 starting at a water inlet 65 provided on an end portion of the flange 61 extends linearly along an inner face of the fourth port member 64 (part f), and extends linearly therefrom along an inner face of the third port member 63 (part g). A coupling 66 is provided in the part g, and the water inlet 59 of the independent exhaust port 16A(1) is connected to this coupling 66. The water passage W1 extending from a coupling 67 to which the water outlet 60 of the independent exhaust port 16A(1) is connected extends linearly along the inner face of the third port member 63 (part h), extends therefrom along the inner face of the third port member 63 in a zigzag shape (part i), extends linearly therefrom along the inner face of the third port member 63 (part j), turns downward through 90°, and communicates with the water outlet 68. The water outlet 68 communicates with an intermediate portion of the main evaporator 11 via a water passage, which is not illustrated.

The water passage W1 extending through the coupling 66 further extends along the inner face of the third port member 63 in a zigzag shape (part k), extends linearly along the inner face of the fourth port member 64 (part m), turns through 90°, extends linearly (part n), further turns through 90°, extends linearly along the inner face of the third port member 63 (part o), and is connected to the water inlet 59 of the independent exhaust port 16A(2) via a coupling 69 provided therein. A coupling 70 to which the water outlet 60 of the independent exhaust port 16A(2) is connected merges with the part j of the water passage W1.

The operation of the embodiment of the present invention having the above-mentioned arrangement is now explained.

In FIG. 1, the major portion of the water discharged from the supply pump 15 of the Rankine cycle system is supplied to the main evaporator 11, which is provided downstream of the exhaust port 16 of the internal combustion engine E, and a portion of the water discharged from the supply pump 15 passes through the auxiliary evaporator 17 provided on the outer periphery of the exhaust port 16 and merges into the main evaporator 11 at a predetermined position.

Figure 11A:
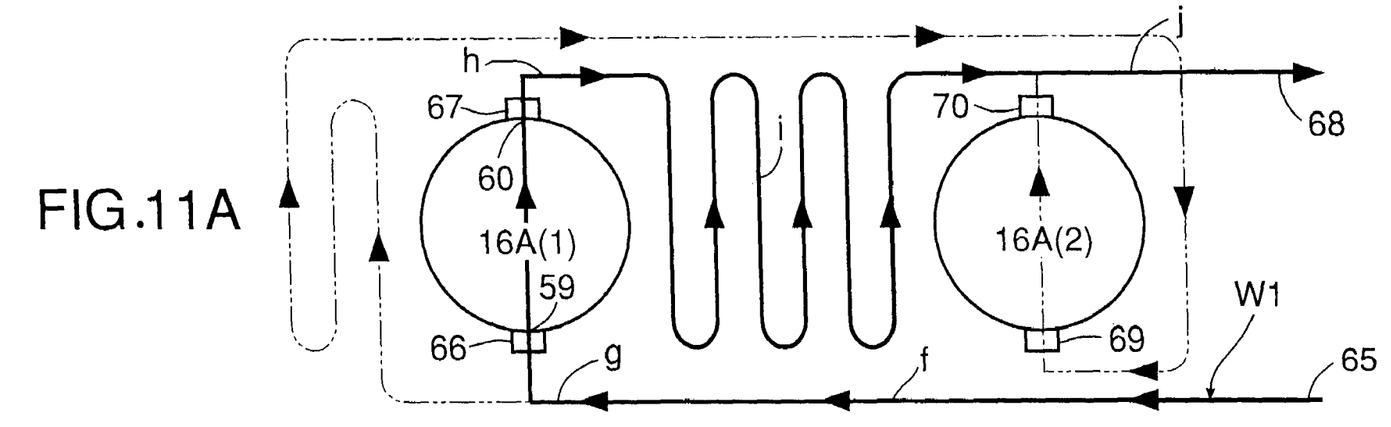
FIG. 11A and FIG. 11B are schematic views showing the flow of water in a grouped exhaust port.
Figure 11B:
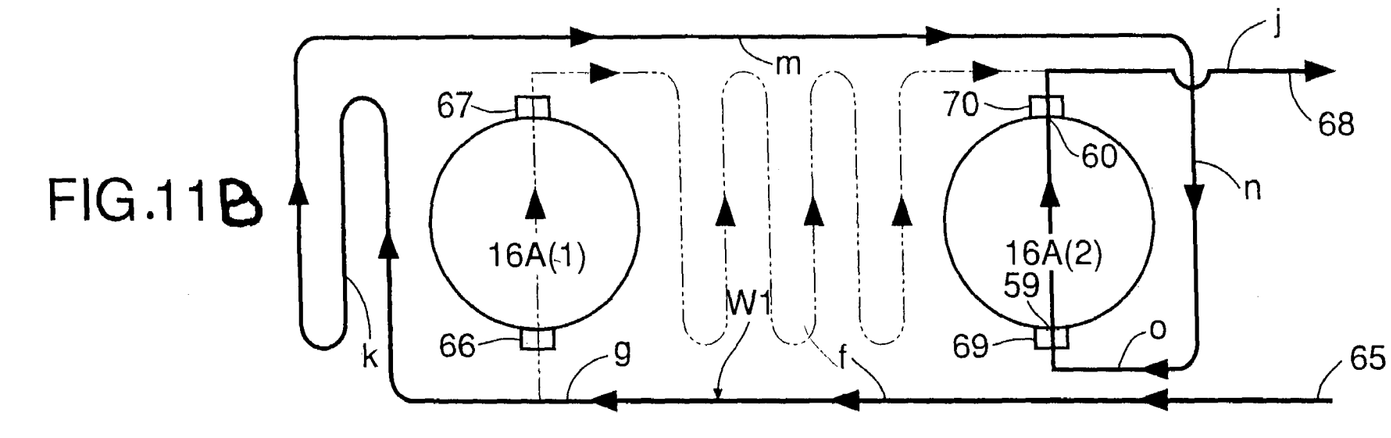

In FIG. 11A and FIG. 11B, water supplied from the supply pump 15 to the auxiliary evaporator 17 flows into the water passage W1 from the water inlet 65 of the grouped exhaust port 16B and the flow is divided into the first line and the second line. The first line shown in FIG. 11A has a route that reaches the water outlet 68 via the part f and the part g of the water passage W1, the coupling 66, the water passage W2 of the independent exhaust port 16A(1), the coupling 67, and the part h, the part i, and the part j of the water passage W1. On the other hand, the second line shown in FIG. 11B has a route that reaches the water outlet 68 via the part f, the part g, the part k, the part m, the part n, and the part o of the water passage W1, the coupling 69, the water passage W2 of the independent exhaust port 16A(2), and the part j of the water passage W1. Since in the first line the first half of the water passage W1 is short and the second half thereof is long, and in the second line the first half of the water passage W1 is long and the second half thereof is short, the overall length of the water passage W1 in the two lines is equalized, thus making the amount of water supplied substantially equal, preventing an imbalance in the waste heat recovery among the independent exhaust ports 16A, and improving the heat exchange efficiency.

As shown in FIG. 7 to FIG. 10, the structures of the water passages W2 provided in the two independent exhaust ports 16A(1) and 16A(2) are identical, and water supplied from the water inlet 59 branches so as to sandwich the plane of symmetry P1, passes through the part a, the part b, the part c, the part d, and the part e, is merged, and is then discharged via the water outlet 60.

In this way, since the auxiliary evaporator 17 is arranged so that the surroundings of the exhaust port 16, which reach a high temperature due to the passage of exhaust gas, are surrounded by the water passages W1 and W2, the exhaust gas heat dissipated from the exhaust port 16 via the cylinder head 20 can be recovered effectively as high temperature, high pressure steam. In particular, since the water supplied to the water passages W1 and W2 is low temperature water that has just been discharged from the supply pump 15, the surroundings of the exhaust port 16 can be cooled effectively, and high temperature, high pressure steam can be generated, thus enhancing the waste heat recovery effect of the internal combustion engine E. Furthermore, although the heat of exhaust gas easily escapes to the outside via the exhaust valve 30, intensive cooling, with low temperature water, of the section that requires cooling of the internal combustion engine E, that is, the exhaust valve seat 29, with which the head 30a of the exhaust valve 30 makes contact, and the vicinity of the exhaust valve guide 40, with which the stem 30b of the exhaust valve 30 makes contact, enables the escape of heat via the exhaust valve 30 to be suppressed, thus further enhancing the waste heat recovery effect, and enables thermal expansion of the exhaust valve 30, the exhaust valve seat 29, and the exhaust valve guide 40, etc. to be suppressed, thus maintaining dimensional and positional precision thereof and thereby maintaining their functions.

Although an embodiment of the present invention is explained in detail above, the present invention can be modified in a variety of ways without departing from the spirit and scope of the present invention.

For example, in the embodiment heated water is supplied to the expander 12 of the Rankine cycle system, but it can be used as a heat source for other auxiliary equipment such as a thermoelectric device.

INDUSTRIAL APPLICABILITY

Although the present invention can be suitably applied to an internal combustion engine that is provided with a Rankine cycle system, the present invention can also be applied to an internal combustion engine for any purpose that recovers and utilizes waste heat.

The invention claimed is:

1. An internal combustion engine, comprising:
   an exhaust port communicating with a combustion chamber formed within a cylinder head; and
   a water passage including channels formed within a wall of the exhaust port;
   wherein said water passage forms a heat exchanger which carries out heat exchange with exhaust gas flowing through said exhaust port and also carries out heat exchange with the exhaust port that is in contact with the exhaust gas.

2. The internal combustion engine according to claim 1, wherein the water passage passes through an area of the exhaust port that exhibits a highest temperature when the engine is operating.

3. The internal combustion engine according to claim 2, wherein the water passage passes through an area of the exhaust port that is in contact with another member of the engine.

4. The internal combustion engine according to claim 1, wherein the water passage passes through an area of the exhaust port that is in contact with an exhaust valve included in the engine.

5. The internal combustion engine according to claim 4, wherein the water passage passes through an area of the exhaust port that is in a vicinity of a valve seat of the exhaust valve.

6. The internal combustion engine according to claim 5, wherein the water passage passes through an area of the exhaust port that is in a vicinity of a valve guide of the exhaust valve.

7. The internal combustion engine according to claim 6, wherein the water passage includes a water inlet and water outlet, and
   wherein the water passage branches into two separate water passages after the water inlet and merges into a single water passage before the water outlet, and extends linearly from the water inlet along a lower face of a downstream portion of the exhaust port, moves therefrom towards an upstream portion of the exhaust port, extends in a semicircular shape along the valve seat of the exhaust valve, extends therefrom linearly upward along a stem of the exhaust valve up to a vicinity of a lower end of the valve guide, extends therefrom toward the exhaust seat of the exhaust valve while being bent in a zigzag shape, returns therefrom back to the downstream portion of the exhaust port, and extends toward the water outlet while being bent in a zigzag shape.

8. The internal combustion engine according to claim 1, wherein water that has passed through the water passage and has an increased temperature is used as a heat source for other auxiliary equipment of the engine.

9. The internal combustion engine according to claim 1, wherein the water passage has a serpentine pattern to cover multiple sides of the exhaust port.

10. An internal combustion engine, comprising:
    an exhaust port communicating with a combustion chamber formed in a cylinder head and including a plurality of independent exhaust ports and a grouped exhaust port combining the plurality of independent exhaust ports; and
    a water passage including a first water passage surrounding the grouped exhaust port and including a second water passage surrounding the plurality of independent exhaust ports, said second water passage including channels formed within a wall of each of the independent exhaust ports,
    wherein at least a portion of the first and second water passages comprises a non-linear pattern to cover multiple surfaces of the exhaust port and extract heat from the exhaust port.

11. The internal combustion engine according to claim 10, wherein the non-linear pattern comprises a zigzag pattern, a winding pattern or a serpentine pattern.

12. The internal combustion engine according to claim 10, wherein the first and second water passages respectively pass through areas of the first and second exhaust ports that are in contact with other members of the engine.

13. The internal combustion engine according to claim 10, wherein the first and second water passages respectively pass through areas of the first and second exhaust ports that exhibit a highest temperature when the engine is operating.

14. The internal combustion engine according to claim 10, wherein the second water passage passes through areas of the independent exhaust ports that are in the vicinity of an exhaust valve included in the engine.

15. The internal combustion engine according to claim 14, wherein the second water passage passes through areas of the independent exhaust ports that are in the vicinity of an exhaust valve seat of the exhaust valve included in the engine.

16. The internal combustion engine according to claim 15, wherein the second water passage passes through areas of the independent exhaust ports that axe in the vicinity of a valve guide of the exhaust valve included in the engine.

17. The internal combustion engine according to claim 16, wherein the second water passage includes a water inlet and water outlet, and wherein the second water passage branches into two separate water passages after the water inlet and merges into a single water passage before the water outlet, and extends linearly from the water inlet along a lower face of a downstream portion of the corresponding independent exhaust port, moves therefrom towards an upstream portion of the corresponding independent exhaust port, extends in a semicircular shape along the valve seat of the exhaust valve, extends therefrom linearly upward along a stem of the exhaust valve up to a vicinity of a lower end of the valve guide, extends therefrom toward the exhaust seat of the exhaust valve while being bent in a zigzag shape, returns therefrom back to the downstream portion of the corresponding independent exhaust port, and extends toward the water outlet while being bent in a zigzag shape.

18. The internal combustion engine according to claim 10, wherein the second water passage has a same pattern in each of the plurality of independent exhaust ports.

19. The internal combustion engine according to claim 10, wherein the first and second water passages are configured to extract heat from the exhaust ports and transfer the extracted heat to an expander to generate mechanical energy.

20. The internal combustion engine according to claim 19, wherein the first and second water passages are also configured to cool the exhaust ports and other members of the engine connected to the exhaust ports so as to maintain dimensional and positional precision between the exhaust ports and the connected members.

21. The internal combustion engine according to claim 10, wherein water is pumped through the water passages via a supply pump connected to the second water passage.

22. An internal combustion engine comprising:

a cylinder head; and an exhaust port formed within the cylinder head and communicating with a combustion chamber, wherein said exhaust port comprises a port member and a cover member which are formed separate from said cylinder head, said cover member covers an outer side of said port member, and a water passage is formed between an inner face of the cover member and a channel formed on an outer face of the port member.

* * * * *